United States Patent [19]

Lechnir

[11] Patent Number: 4,728,514

[45] Date of Patent: Mar. 1, 1988

[54] METHOD FOR COLORING LIVE BAIT

[76] Inventor: Al M. Lechnir, P.O. Box 6917, Gulfport, Miss. 39506

[21] Appl. No.: 885,211

[22] Filed: Jul. 14, 1986

[51] Int. Cl.$^4$ .............................................. A23L 1/275
[52] U.S. Cl. ........................................ 426/1; 426/2; 426/250
[58] Field of Search .............................. 426/1, 2, 250

[56] References Cited

U.S. PATENT DOCUMENTS

| | | | |
|---|---|---|---|
| 2,849,981 | 9/1958 | Rose et al. | 426/1 |
| 2,961,319 | 11/1960 | Stephen | 426/1 |
| 3,889,638 | 6/1975 | Riley | 426/1 |
| 3,906,112 | 9/1975 | Anderson | 426/1 |
| 4,239,782 | 12/1980 | Cinquemani | 426/2 |
| 4,477,475 | 10/1984 | Fishman | 426/250 |
| 4,585,655 | 4/1986 | Sherbanko | 426/250 |

*Primary Examiner*—Jeanette Hunter
*Attorney, Agent, or Firm*—Alexander F. Norcross

[57] ABSTRACT

A method of coloring live bait by immersing the live bait in a dye medium for 2-10 min. The dye medium contains water, salt equal to or less than that required for a saturated salt sol and an edible dye in not greater than four times the volume of salt.

4 Claims, 6 Drawing Figures

METHOD FOR COLORING LIVE BAIT

BACKGROUND OF THE INVENTION

This invention relates to a process for creating colored baits for the purpose of attracting and catching fish.

It has been known in the art of fishing that various colors, especially bright or florescent colors, are selectively attractive to desirable fish species, and that lures or baits which have been colored tend to be selectively attractive to desirbale fish species and increase the probability of catching fish.

The process of attracting fish by means of color added to baits is not a simple one. Color occurs in nature, and color vision is used by predatory species such as game fish, both as a method of identifying desirable food as well as a method of identifying undesirable or poisonous prey. Thus, it is overly simplistic to say that baits with colors having high visibility in water, such as yellow or orange, are always the most desirable or most readily selected baits.

As a single example, the monarch butterfly, showing a bright orange color vividly outlined in black, is a toxic species due to its habit of laying its eggs upon and eating milkweed. While an orange colored lure in most fresh water environments would tend to resemble crawfish, a desirable prey species, and thus would be attractive, in certain environments shallow water fish which are exposed to such dangerous prey may avoid yellows and oranges in favor of alternate colors.

Thus, while in general orange, yellow, and red lures tend to be most effective, there are occasions where lures of less obvious colorations such as blue or green may be most effective.

It is equally known that it is often advantageous that a lure be a specular color, having a high reflectance such as may be provided by silver highlights. However, a specular highlight can also mask a bait or prey, making it less obvious, by matching the reflective properties of rippled or disturbed water.

For this reason, while it is know that baits and lures may be more advantageously used if they display colors, a practical coloration method requires the ability to produce baits having a wide choice of color and having both specular and non-specular reflective characteristics.

Known prior art methods of dying baits involve the use of immersion into or injection under pressure of a toxic dye, suitable only for dead baits and artificial lures.

Prior art U.S. Pat. Nos. 4,489,981 and 3,545,404 disclose a method of dying live worms which involves raising the worms in a specially treated worm culture medium for a period of in excess of one week. The method, as disclosed, is suitable only for worms or for other bait that can be raised in a worm culture medium.

The known methods for coloring live baits are typically shown in U.S. Pat. No. 4,486,460 in which an external physical coating is placed upon a live bait. This patent reveals the extreme difficulty of applying a coating to a live bait which is not toxic to the bait and which does not almost immediately wash off. In an analogous manner U.S. Pat. No. 4,202,905 teaches a method of applying luminous bacteria within a gel to the outer surface of a live bait in order to increase the attractiveness of the bait.

SUMMARY OF THE INVENTION

This invention discloses a process for inducting coloration into the body of live bait species in the fish food chain, especially minnows and similar aquatic species. Two basic techniques are shown, both of which preserve the vitality of the live bait and one of which creates coloration in the live bait which is retained for a period approximating four days.

The process involves immersing the live bait, preferably minnows, in a solution which includes a specified ratio of standard food color combined with a saline base.

It has been determined that the addition of food color alone to an aquatic medium containing a live bait is toxic to the bait and results in unusually high kill ratios. The inventive process disclosed here intermixes the food color with a saline base in specified ratios, and it has been discovered that such a mixture has extremely low toxicity and promotes ingestion of the food color into the bait species.

Standard food colors, as approved by the FDA, are suitable for this process. In addition, because in a practical fish catching situation the bait is not digested by the fish, it has been found that the formerly approved, but now banned, FD&C Red Dye No. 2 is effective. Red Dye No. 2 is not immediately toxic to the minnow and, as it is not ingested into the body of the game fish, does not propagate through the food chain.

The process as described is restricted to food colors solely becase of the toxicity of other, otherwise suitable dyes, many of which use arsenical bases, or toxic organic chemicals which defeat the purpose of the invention.

It is found that minnows that have been immersed in the inventive solution as described remain fully alive and agile and are fully suitable for use as live bait. Depending upon the version of the process shown the minnow will retain its color for up to four days. In comparative tests using a specific yellow dyed minnow against uncolored minnows of the same species, it was found that a colored minnow was preferered by game fish in a six to one ratio over the plain minnows.

The process is suitable for use on all bait or prey species which are native to an aqueous environment.

DETAILED DESCRIPTION OF THE PREFERRED EMBODIMENT

Figure 1:
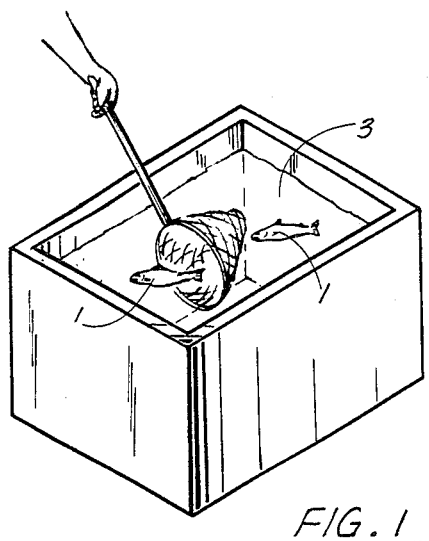
FIG. 1 depicts a live bait species within an aqueous environment.
Figure 2:
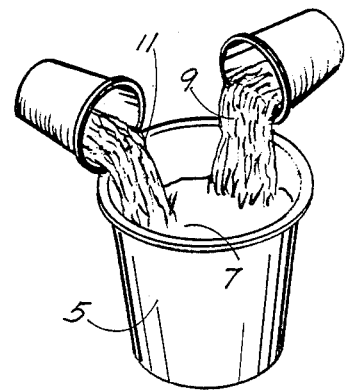
FIG. 2 depicts the addition of the components of the inventive process to water, forming the dying medium.
Figure 3:
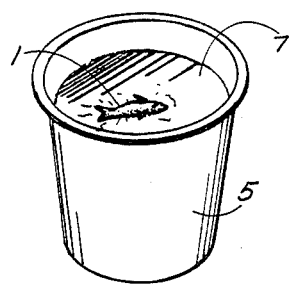
FIG. 3 depicts the placement of the bait within the dying medium.
Figure 4:
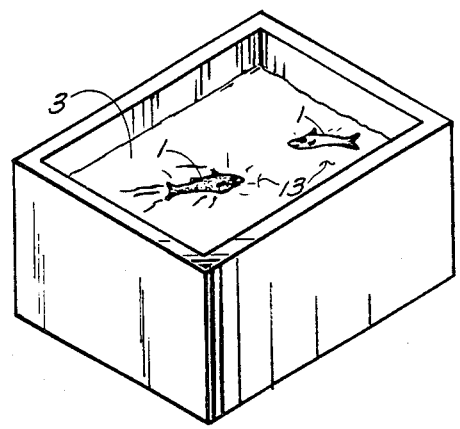
FIG. 4 depicts the live, active, colored bait returned to its aqueous environment after application of the inventive process.
Figure 6:
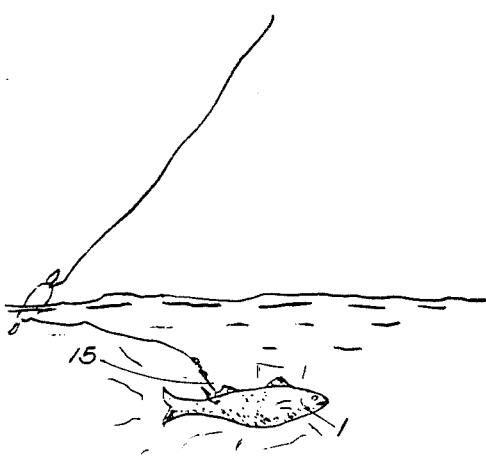
FIG. 6 shows the colored bait in use.
Figure 5:
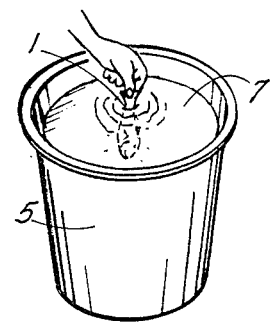
FIG. 5 depicts a live bait being introduced into a solution of the second process.

The process of this invention is shown figuratively in FIGS. 1-3 of the drawings.

The process herein described is intended for use upon a live bait 1, shown in this example as being a minnow. The minnow may be any small fish, including an immature member of larger species. In general, the more common bait minnows include chub minnows and shiners; the latter so named because of their glistening appearance. The invention is not restricted to such minnows, and the illustrative live bait 1 includes any aquatic bait specie whether vertebrate or invertebrate. The live bait 1 also includes bait species for both fresh and salt water use, the minnows of the preferred embodiment described being fresh water minnows. It is, of course, known that there are legal restrictions on the specie that can be used as bait for fishing; a specific example being a general prohibition against using the minnows (immature fingerlings) of known game fish species as bait.

In the process of the invention the live bait if found in an aqueous medium 3; this, of course, is water, either fresh or salt, depending upon the specie of bait encountered. As described in the background of the invention, it has been found generally desirable to add color to bait in order to make it more attractive and in order to selectively attract desired fish species to the bait and lure. The prior art methods for coloring live bait have all involved placing a temporary external skin coating upon the bait 1; the process herein described rather provides an internal metabolic dye which does not wash off and which provides a durable but vivid coloration, while retaining the vitality of the bait 1.

In the first embodiment of the process, the bait 1 is placed within a dying container 5 supported therein within a water based dying medium 7. This medium comprises water, to which is added an organic dye 9 chosen from that class of Food and Drug Administration approved food colors or from the formerly approved FD&C Red Dye No. 2.

All such dyes are subject to the approval and certification of the Secretary, pursuant to 21 U.S.C. §376, as implemented in 21 C.F.R. §70. Such approved dyes are listed at 21 C.F.R. §73 subpart A; §74 subparts A and B; and §82 subpart B. FD&C Red Dye No. 2 was formerly approved, but the approval has been withdrawn, 21 C.F.R. §81.10(f). The phrase approved dyes or edible dyes throughout this specification means those specific dyes listed according to Secretarial mandate in the references cited above which are incorporated herein by reference. These dyes are preferably administered and admixed in their dry, powdered form so that they may be easily measured volumetrically to achieve the proportions described below.

Also added to the dying medium 7 is salt 11, in the preferred embodiment in the form of sodium chloride. The salt is also preferably induced in powdered form for ease of volumetric measuring.

In the preferred form of the first embodiment it is found that in a Seventy degree solution of dying medium 7 that for each half pint of medium 7 the preferred proportion is four teaspoons of powdered dye 9 to one teaspoon of sodium chloride 11. The live bait 1 is introduced into the dying medium 7 for a period of between two to ten minutes to achieve a semipermanent color change of up to four days. It takes up to twenty minutes for the minnow 1 to change color using this method after it is removed from this medium 7 and placed back in water 3.

The live bait is then reintroduced into its original aqueous medium 3. After the color change is complete, the bait will remained fully colored for at least Twenty-four hours if it is extremely active; if the water temperature of aqueous medium 3 is lowered so as to slow the activity of the bait, it is found that the coloration lasts from three to four days.

It is found that the above ratio of four volumetric measures of dye to one volumetric measure of salt is the minimum amount of salt which must be added in proportion to the dye in order to maintain viability of the live bait; elimination of the salt produces an unacceptable mortality rate within the bait. An alternative ratio tested is two parts of dye by volume to one part of salt by volume. It is found that the maximum amount of dye and salt may be determined by the amounts necessary to produce a saturated salt solution, at the maximum four to one dye to salt ratio; and it has been found that even fresh water minnows, immersed for two to ten minutes in such a solution, remain viable and produce substantial coloration in a saturated saline and dye solution at Seventy degrees.

An alternate form of the invention produces a short term coloration of immediate effect and is most suitable for immediate use while fishing. In this, the water based medium 7 is made up by adding in combination four teaspoons of powdered dye 9, one teaspoon of powdered salt 11 to four fluid ounces of water forming the dye solution 7. The live bait, in the example tested a minnow, is immersed for two to three seconds and then removed and replaced in its normal aqueous medium 3. The short term immersion in the more concentrated solution provides a substantial dye coloration which lasts for approximately Thirty minutes in a normally active minnow.

In a test of one specific version of the invention, a dye medium 7 was made up of four parts yellow food color to one part of salt in a Seventy degree water based medium 7 and a number of minnows were introduced into the solution for a period of ten minutes. The minnows after removal developed a bright yellow color in comparison with a control group of undyed minnows of the same species. The yellow minnows were fished side by side with undyed minnows in the same waters by two fishermen. The strike ratio, the number of strikes upon each bait, averaged six strikes on the yellow minnows to every one strike for the uncolored minnows.

In another test, a number of minnows were colored blue using a blue food dye at a four to one dye to salt ratio and a second set were colored green. When fished with surface feeding game fish, there was not a significant difference noted between the blue and the green minnows and an undyed control group in terms of selectivity. However, when fished against flounder, a bottom feeding species, commonly found in the Gulf of Mexico, the green minnows were noted to have a significantly higher strike rate than undyed minnows used in comparison.

It has been noted that in terms of visual comparison, shiners, treated by the process described above, envice a brighter coloration than chub minnows. However, for the reasons discussed in the background of the invention above, there is not a directly predictable relationship between the shininess or the dullness of the color and the desirability of the bait in every given situation.

It has been found that the live bait 1 in the form of both shiner and chub minnows when, treated with the first form of the process, described above as the long term dying process, will maintain their color from between Twenty-four hours to four days depending on bait activity. The bait mortality is extremely low and the minnows, if not fished, will survive well the metabolization of the dye, and may, in fact, be retreated without adverse affect.

It has, however, been found that immersion of minnows into an aqueous solution consisting solely of food color kills substantially all the minnows; thus the combination as disclosed above is necessary to maintain the vitality of the bait while providing an internally non-washable coloration.

The coloration 13 of the minnows is an internal coloration, not an external coating, and does not wash off. It gradually dissipates in a live minnow due to metabolic activity, but can be replaced by repeated applications of the process described above. The duration of the coloration is such as to provide a brightly colored live bait for period of time adequate for almost all conceivable fishing expeditions. The short term process provides an immediate method of dying a minnow to meet local environmental requirements where it is discovered that a less common color (e.g. green) is needed, or where an alternative live bait such as crawfish or fresh water shrimp, are found to be the preferred feeding, and where they are available for capture and dying on sight.

In use the live bait 1 treated by the process evinces a color 13 but it otherwise remains fully active in its aqueous medium 3. It can thus be hooked or placed upon hooks 15, as well understood in the art for fishing live bait, and employed as with standard live bait for catching fish. As described in the specific examples shown above, correct selection of color for the species being fished and for the environment results in a significant increase in the number of strikes and in the number of fish caught. The specific colors 13 to be used will be those which are known in the prior art for the specific fish species sought to be fished and the environment; it is understood, of course, that the art of color selection in the field of baits and lures is still more an art than a science and reasonable men have been known to differ as to the color to be used at a given point. It is unquestioned, however, that selection of an appropriate color in any given situation produces a noticeable increase in selection of the color bait by the chosen species being fished. The current invention provides a practical method for providing such coloration for a live bait without adversely effecting the other desirable aspects of live bait fishing.

It thus should be seen that the invention is not restricted to the specific examples given above but rather to that broader method as claimed below.

I claim:

1. A method for coloring a live bait species within an aqueous medium comprising:
    A. forming an aqueous dye medium from the combination comprising:
        i. water;
        ii. salt in a volumetric quantity equal to or less than an amount required to form a saturated solution of salt within the water; and
        iii. an edible dye in a volumetric quantity in dry form not greater than four time the volume of the salt;
    B. immersing the live bait into the medium for a period between two minutes and ten minutes.

2. The process described in claim 1 above wherein the edible dye further comprises:
    A. a powdered dye chosen from the group consisting of:
        i. dyes as approved by the Food and Drug Administration for addition to foods or ingestible drugs; and
        ii. FD&C Red Dye No. 2.

3. A method for coloring a fresh water live bait species within an aqueous medium comprising:
    A. forming an aqueous dye medium from the combination comprising:
        i. water;
        ii. salt in a volumetric quantity equal to or less than an amount required to form a saturated solution of salt within the water; and
        iii. an edible dye in a volumetric quantity in dry form not greater than four time the volume of the salt;
    B. immersing the fresh water live bait into the medium for a period between two minutes and ten minutes.

4. The process described in claim 1 above wherein the edible dye further comprises:
    A. a powdered dye chose from the group consisting of:
        i. dyes as approved by the Food and Drug Administration for addition to foods or ingestible drugs; and
        ii. FD&C Red Dye No. 2.

* * * * *